Feb. 25, 1969 H. KRAUTWALD ET AL 3,430,019

RELAY CONTACT ARRANGEMENTS WITH CONNECTIONS FOR PRINTED CIRCUIT BOARDS

Filed June 22, 1967

INVENTORS

*Herbert Krautwald*

*Harry Schröeder*

BY *Stiee & Stiee*

ATTYS.

United States Patent Office 3,430,019
Patented Feb. 25, 1969

3,430,019

RELAY CONTACT ARRANGEMENTS WITH CONNECTIONS FOR PRINTED CIRCUIT BOARDS

Herbert Krautwald and Harry Schröder, Munich, Germany, assignors to Siemens Aktiengesellschaft, a corporation of Germany Filed June 22, 1967, Ser. No. 648,024
Claims priority, application Germany, June 30, 1966, S 104,543
U.S. Cl. 200—166 6 Claims
Int. Cl. H01h 3/00

ABSTRACT OF THE DISCLOSURE

A contact arrangement, particularly for miniature relays connectable with printed circuit boards, in which the contact springs, which may carry individual contact members, are formed from thin wire spring stock, and mounted on a retaining body of insulating material having openings therein in which terminal portions of the springs are disposed, each body being provided with fixed abutments forming supporting and positioning elements engageable with the contact springs whereby the contact springs are properly positioned without special adjustment operations and replacement may readily be effected, and in which the electrical contact connection terminals are in the form of loops, of generally hairpin configuration, providing increased mechanical rigidity in such connections as well as producing a capillary action during a flood bath soldering operation, to provide an improved soldered connection.

Figure 1:
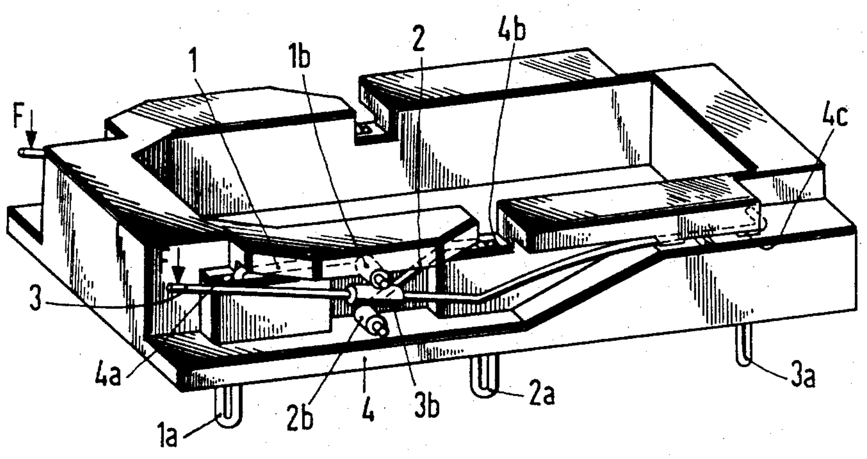

In contact arrangements for miniature relays it is difficult to so arrange the contact springs that little adjustment is required and to conserve space whereby the electrical connecions with printed circuit boards can be fabricated without special mounting means. This is particularly true with respect to ordinary leaf springs, which are not suitable for the space saving construction of a contact spring assembly. Here the mounting and adjustment of the relatively thin springs utilized are particularly difficult, considering the small size of such arrangements.

It is known in the prior art to employ wire springs in contact arrangements for relays instead of the usual leaf springs. Of course, here too, special mounting means are necessary as a rule, in order to retain such wire spring contact arrangements in assembled relation or to impart a predetermined position to the individual springs. It is possible to obtain a common mounting supporting of insulating material by injection molding the wire springs. While the former solution requires an increased expenditure for the fabrication and mounting of the contact arrangement due to the necessary mounting means, the latter solution has the disadvanage that defective contact springs cannot be replaced.

Considering the small size of contact arrangements with connections for printed circuit boards, the possibility of failure of individual contact springs is greater than is the case in the otherwise normal, more sturdy forms of construction. Furthermore, there is a considerable danger in the use of thin wie springs of this kind of the connection becoming bent or that in soldering, for example, in a flood bath process, the connection ends do not sufficiently take up solder on the printed circuit boards. Consequently, in known forms of construction disadvantages exist, in opposition to the advantages resulting from the use of wire spring contacts, disadvantages which have an unfavorable effect, especially an automatic production.

The invention discloses a way, despite the use of wire springs, to eliminate such disadvantages in a contact arrangement of the type initially described, having a tolerance-free attachment of the contact springs and therewith an adjustment-free mounting. This is achieved, in accordance with the invention, by forming the contact springs, which preferably form a switch contact, of spring wire and supporting the same in openings of a body of insulating material by bracing between fixed rigid supporting and positioning points, the electrical connection of the contact springs necessary for engagement with the printed circuit board being constructed of hairpin-shape. The advantage of the solution according to the invention lies, first of all, in the fact that tolerance and other variations in the contact forces remains very small without requiring time and expense for special adjustments. A further advantage is derived from the hairpin-shaped formation of the electrical connection of the contact springs, whereby such shaping not only increases the mechanical rigidity of these connections, but also results in the formation of a capillary action in the flood bath soldering. Consequently, the soldering security is considerably increased, which is especially important in the use of thin wires.

In the simplest case, the contact springs are made of contact material with spring properties. However, it is also possible to mount special contact members on the spring formed from spring wire, resulting in the advantage that the springs themselves can be selected solely with respect to their resilient properties. In this connection, it is expedient to design the contact members in the shape of a sleeve and to slide them on the wire springs. The body of insulating material which has corresponding openings for the individual contact springs is, for the sake of expediency, made of a highly stable material which will not exhibit undesirable decomposition. This is especially of importance if the relay or the contact arrangement is to be hermetically sealed.

Figure 2:
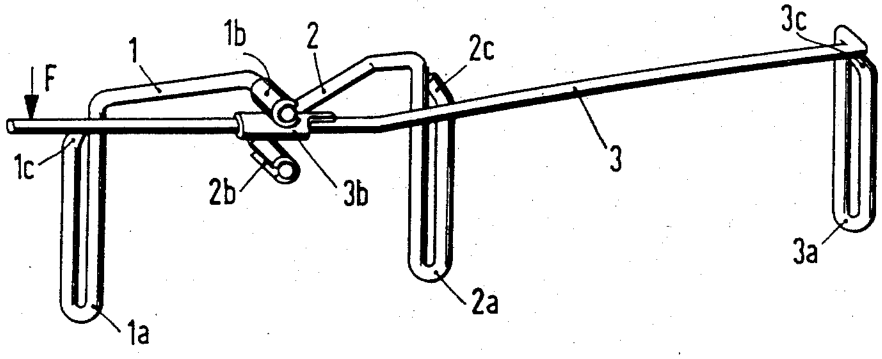

Further particulars of the invention will be apparent from the following description and the drawings, in which like reference characters indicate like or corresponding parts, and in which:

FIG. 1 is a perspective view, illustrating a body of insulating material forming a carrier for a contact arrangement of a relay with inserted wire springs according to the invention; and FIG. 2 is a similar view representing an enlargement of the individual wire springs of such a switch contact arrangement, omitting the supporting body of insulating material.

A body 4 of a stable insulating material serves as a common carrier for the two switch contacts formed from wire spring stock and for the magnetic system of a relay, not illustrated. The carrier body 4 has openings *4a*, *4b* and *4c* of a non-circular cross section, which is illustrated to be a rectangle, and a pair of opposed abutments or supporting and positioning points adjacent each of the openings *4a*, *4b* and *4c*. Switch contacts are provided on both longitudinal sides of the carrier body 4 of insulating material, whereby substantially only the foremost contact springs 1, 2 and 3 are visible and which are provided with loops forming pin-shaped ends or terminal portions *1a*, *2a*, *3a*. Such contact arrangement comprises a stationary rest contact spring 1, a relatively stationary main contact spring 2 and a central movable contact spring 3. The wire springs utilized have the desired spring properties and are provided with corresponding contact members *1b*, *2b*, *3b*, which are constructed in the form of a sleeve, for effecting the actual contacting. Mounting of such sleeves can be effected in the usual manner, for example, by soldering or welding. Each of the contact springs 1, 2 and 3 has a straight intermediate portion which is adjacent to each of the terminal portions *1a*, *2a* and *3a* and which extends toward the contact portions *1b*, *2b* and *3b*.

The contact springs 1, 2 and 3 are bent at their looped or hairpin-shaped ends *1a*, *2a*, *3a* at respective predetermined prestressing angles and when inserted in the openings 4*a*, 4*b*, 4*c* of the body of insulating material 4 they create corresponding forces which are outwardly directed to effect the exact positioning. In addition, the ends of the contact springs are respectively provided with slight bends forming short end portions at 1*c*, 2*c* and 3*c* as can be seen in FIG. 2. In this way the electrical connections, located in predetermined position, are supported non-rigidly on the straight connecting wire through the bent ends 1*c*, 2*c* and 3*c*, so that a good positioning of these connections in the openings 4*a*, 4*b* and 4*c* is achieved. Likewise, an inadvertent bending of these electric connections does not affect the proper positioning of the contact springs or contact members, respectively.

Naturally, the hairpin-shaped construction of the ends 1*a*, 2*a* and 3*a* of the contact springs 1, 2 and 3 increases the soldering security in a flood bath soldering, since considering more liquid solder will be taken up as a result of the capillary action of such hairpin-shaped parts. Due to the increased rigidity attained through this formation, these ends of the thin wire contact springs can, if necessary, also be used as plug type connections.

The above described solution results in a particularly-adjustment-free construction, as the supporting and positioning points produced in the formation of the body 4 of insulating material determine the contact distance as well as the rest contact force. The point of impact under normal service conditions of the actuating force exerted by the armature of the relay system is designated in both figures by the letter F.

Changes may be made within the scope and spirit of the appended claims which define what is believed to be new and desired to have protected by Letters Patent.

We claim:

1. A contact arrangement for a relay structure, particularly of the miniature type, comprising:

- a carrier body of insulating material having at least three openings of non-circular cross sections, said body having a pair of opposed abutments disposed adjacent each of said openings; and
- a contact spring for each of said openings and having a contact portion, a terminal portion and an intermediate portion extending therebetween, said terminal portion being in the form of a loop of general prestressed hairpin configuration, each of said contact springs being detachably connected to said carrier body with the respective terminal portion extending through one of said openings and being tightly received in said openings, and the intermediate portion of the contact springs being engaged adjacent the terminal portion by the pair of abutments associated with said one opening so that each pair of abutments and their respective openings coact with the respective contact spring to align said spring in a relay structure on said carrier body.

2. A contact arrangement according to claim 1, wherein said contact springs comprise an effiecient contact material having a resilient properties.

3. A contact arrangement according to claim 1, wherein said contact springs are constructed from spring wire and contact members of an efficient contact material are mounted on the respective wires for contact between such members.

4. A contact arrangement according to claim 3, wherein such contact members are in the form of a sleeve carried by and secured to the cooperable contact springs.

5. A contact arrangement according to claim 1, wherein the free end of the wire forming said terminal portion has a bent portion to form an elongated closed loop.

6. A contact arrangement for a relay structure, particularly of a miniature type, comprising:

- a carrier body of insulating material having openings therein, said body having a pair of opposed abutments disposed adjacent each of said openings; and
- a contact spring for each of said openings and having a contact portion, a terminal portion, and an intermediate portion therebetween, said terminal portion being in the form of a loop of a general prestressed hairpin configuration with a pair of legs, a free end of one leg having a bent portion contacting the other leg to close the loop, each of said contact springs being detachably connected to said carrier body with the respective terminal portion extending through one of the openings and being tightly received in said openings, and the intermediate portion of the contact springs being engaged adjacent the terminal portion by the pair of abutments associated with said opening, so that each pair of the abutments and their respective openings coact with the respective contact spring to align said spring in a relay structure on said carrier body.

References Cited

UNITED STATES PATENTS

| | | | |
|---|---|---|---|
| 2,755,346 | 7/1956 | Fisher | 200—166 |
| 3,239,639 | 3/1966 | Roback | 200—166 |
| 3,274,355 | 9/1966 | Francy | 200—166 |

ROBERT K. SCHAEFER, *Primary Examiner.*

H. O. JONES, *Assistant Examiner.*